(12) United States Patent
Yamauchi et al.

(10) Patent No.: US 10,174,728 B2
(45) Date of Patent: Jan. 8, 2019

(54) HEAT STORAGE DEVICE

(71) Applicant: KABUSHIKI KAISHA TOYOTA CHUO KENKYUSHO, Nagakute-shi, Aichi-ken (JP)

(72) Inventors: Takafumi Yamauchi, Nagakute (JP); Yasuki Hirota, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/399,027

(22) Filed: Jan. 5, 2017

(65) Prior Publication Data

US 2017/0211532 A1 Jul. 27, 2017

(30) Foreign Application Priority Data

Jan. 25, 2016 (JP) ................... 2016-011655

(51) Int. Cl.
| | |
|---|---|
| *F02B 43/02* | (2006.01) |
| *F02M 37/22* | (2006.01) |
| *F02M 37/00* | (2006.01) |
| *F02M 25/08* | (2006.01) |
| *F02B 43/08* | (2006.01) |

(52) U.S. Cl.
CPC ......... *F02M 37/223* (2013.01); *F02B 43/08* (2013.01); *F02M 25/08* (2013.01); *F02M 37/0023* (2013.01); *F02M 37/0064* (2013.01); *F02B 43/02* (2013.01); *Y02T 10/32* (2013.01)

(58) Field of Classification Search
CPC ............ F02M 37/223; F02M 37/0023; F02M 37/064; F02M 25/08; F02B 43/02
See application file for complete search history.

(56) References Cited

U.S. PATENT DOCUMENTS

| | | | | |
|---|---|---|---|---|
| 2007/0044485 A1* | 3/2007 | Mahl | .......................... | F17C 5/06 62/50.2 |
| 2007/0289638 A1* | 12/2007 | Ishitoya | .............. | F16K 31/1221 137/455 |
| 2014/0290611 A1* | 10/2014 | Abd Elhamid | ......... | F02B 43/02 123/1 A |

FOREIGN PATENT DOCUMENTS

| | | |
|---|---|---|
| EP | 0745499 A2 | 12/1996 |
| JP | H05-133280 A | 5/1993 |
| JP | H08296921 A | 11/1996 |
| JP | H09-42093 A | 2/1997 |
| JP | 2003-270113 A | 9/2003 |
| JP | 2003336547 A | 11/2003 |
| JP | 2004092585 A | 3/2004 |

(Continued)

OTHER PUBLICATIONS

Apr. 3, 2018 Office Action issued in Japanese Patent Application No. 2016-011655.

(Continued)

*Primary Examiner* — Jacob Amick
*Assistant Examiner* — Charles Brauch
(74) *Attorney, Agent, or Firm* — Oliff PLC

(57) ABSTRACT

A heat storage device including a fuel tank holding a fuel to be combusted in an engine, a heat storage vessel including a heat storage material that dissipates heat by adsorbing or chemically reacting with a fuel gas that has been vaporized, and that stores heat by desorption by heating the fuel gas, a first flow path to feed the fuel from the fuel tank to the heat storage vessel, and a second flow path to feed the fuel gas from the heat storage vessel to the engine.

8 Claims, 8 Drawing Sheets

(56) References Cited

FOREIGN PATENT DOCUMENTS

| | | |
|---|---|---|
| JP | 2004-308844 A | 11/2004 |
| JP | 2012219647 A | 11/2012 |
| JP | 2015-183984 A | 10/2015 |

OTHER PUBLICATIONS

Dec. 19, 2017 Office Action issued in Japanese Application No. 2016-011655.

* cited by examiner

HEAT STORAGE DEVICE

CROSS-REFERENCE TO RELATED APPLICATION

This application claims priority under 35 USC 119 from Japanese Patent Application No. 2016-011655 filed on Jan. 25, 2016, the disclosure of which is incorporated by reference herein in its entirety.

BACKGROUND

Technical Field

Preferred embodiments relate to a heat storage device.

Related Art

There are heat transport devices provided with two or more adsorption vessels that store heat by desorption of ammonia and dissipate heat by adsorption of ammonia, and employ a difference in ammonia pressure arising between the adsorption vessels to transport the ammonia from one of the adsorption vessels to the other adsorption vessel (see, for example, Japanese Patent Application Laid-Open (JP-A) No. 2015-183984).

SUMMARY

In a heat transport device with a structure such as that described above, one of the adsorption vessels is utilized as a heat storage vessel and emits ammonia during heat storage, and the other adsorption vessel holds the emitted ammonia. Equipping such a structure with plural adsorption vessels leads to an increase in bulk of the device overall, and leads to an increase in complexity of the structure.

An exemplary embodiment of technology disclosed herein provides a heat storage device with a compact and simple structure.

A first aspect of technology disclosed herein is a heat storage device including a fuel tank holding a fuel to be combusted in an engine, a heat storage vessel including a heat storage material that dissipates heat by adsorbing or chemically reacting with a fuel gas that has been vaporized, and that stores heat by desorption by heating the fuel gas, a first flow path to feed the fuel from the fuel tank to the heat storage vessel, and a second flow path to feed the fuel gas from the heat storage vessel to the engine.

In such a heat storage device, fuel gas from vaporization of the fuel that was stored in the fuel tank is fed to the heat storage material through the first flow path, and heat is dissipated by the fuel gas being adsorbed to, or chemically reacting with, the heat storage material. Heat is stored by desorption by heating the fuel gas of the heat storage material. The desorbed fuel gas is fed to the engine through the second flow path.

Thus by utilizing the fuel held in the fuel tank as a reaction medium for the heat storage material, there is no need to provide an additional member to supply a reaction medium to the heat storage vessel. Moreover, the fuel held in the fuel tank is also fuel to be combusted by the engine, and fuel desorbed from the heat storage material is combusted in the engine, so there is also no need for a member to hold the fuel desorbed from the heat storage material. A heat storage device having a compact and simple structure is thereby obtained.

A second aspect of technology disclosed herein is the first aspect of technology disclosed herein, further including a circulation flow path that circulates engine cooling water between the heat storage vessel and the engine.

Heat transfer can accordingly be induced between the heat storage vessel and the engine cooling water. It is, for example, possible to cause the heat of the heat storage vessel to act on the engine cooling water during engine warming or the like.

A third aspect of technology disclosed herein is the second aspect of technology disclosed herein, wherein the heat storage vessel desorbs the fuel gas using heat from the engine cooling water.

Namely, heat of the engine cooling water is employed in the heat storage vessel when the fuel gas is desorbed and heat is stored, thereby enabling efficient heat storage.

A fourth aspect of technology disclosed herein is any one of the first to third aspects of technology disclosed herein, wherein the heat storage material is an adsorbent that adsorbs the fuel gas.

Heat can be efficiently dissipated from the adsorbent by utilizing adsorption of fuel gas to the adsorbent.

A fifth aspect of technology disclosed herein is any one of the first to fourth aspects of technology disclosed herein, wherein the fuel is a gaseous fuel that is in a gaseous phase in a state of being held in the fuel tank.

Efficiency is achieved due to feeding gaseous fuel held in the fuel tank, without vaporization, to the heat storage vessel, and adsorbing or chemically reacting the fuel with the heat storage material.

A sixth aspect of technology disclosed herein is the fifth aspect of technology disclosed herein, wherein a pressure regulation valve is provided on the first flow path to regulate a pressure of the gaseous fuel.

The gaseous fuel in the fuel tank can be regulated to a desired pressure using the pressure regulation valve, and fed to the heat storage vessel.

A seventh aspect of technology disclosed herein is any one of the first to fourth aspects of technology disclosed herein, wherein the fuel is a liquid fuel that is in a liquid phase in a state of being held in the fuel tank, and a vaporizer is provided on the first flow path, the vaporizer vaporizing the liquid fuel.

Even when the fuel held in the fuel tank is a liquid fuel, the fuel can be induced to be adsorbed or chemically react in the heat storage vessel by being vaporized by the vaporizer.

Due to adopting the above configurations, the technology disclosed herein obtains a heat storage device having a compact and simple structure.

BRIEF DESCRIPTION OF THE DRAWINGS

Exemplary embodiments of the present invention will be described in detail based on the following figures, wherein.

DETAILED DESCRIPTION

Figure 1:
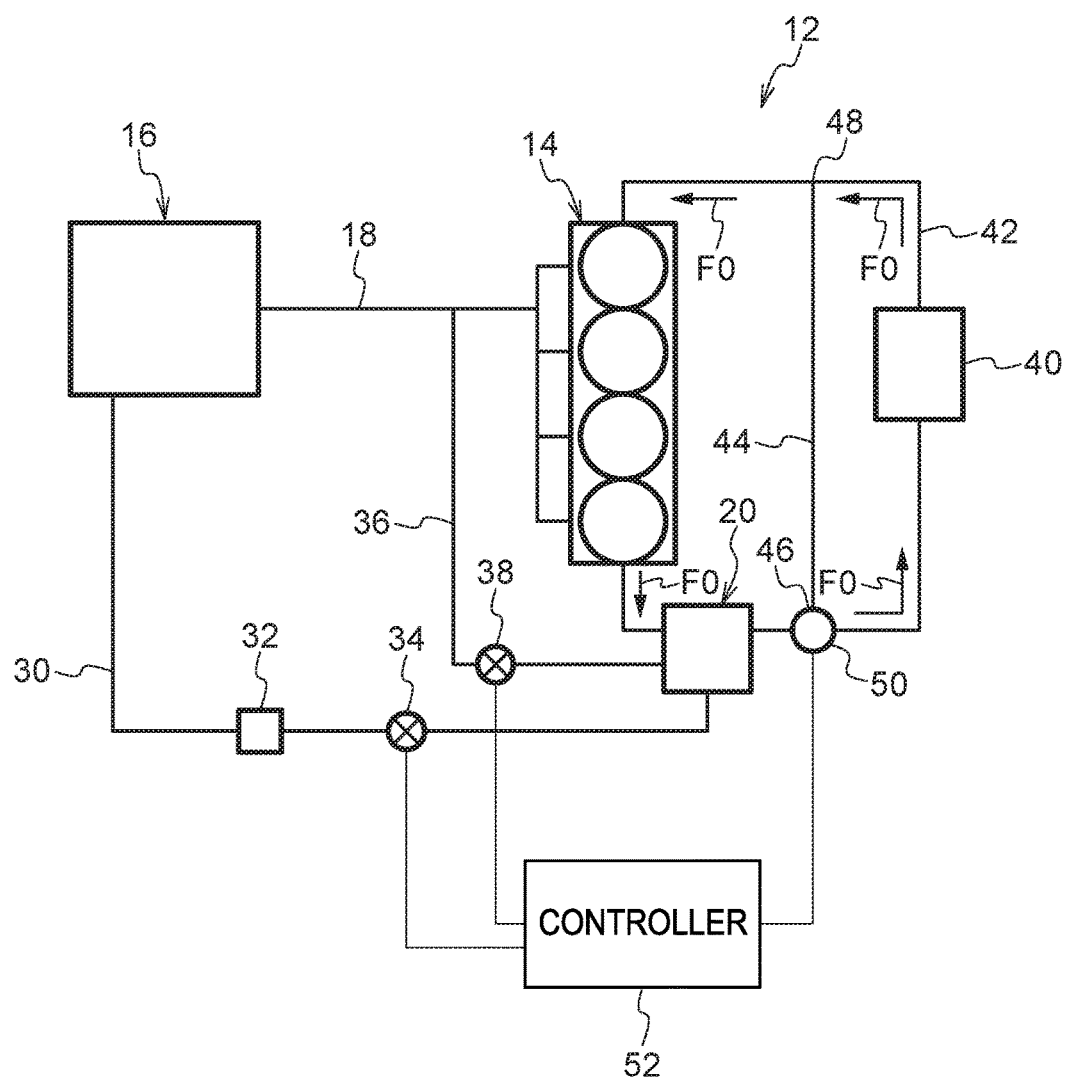
FIG. 1 is a schematic diagram illustrating a configuration of a heat storage device of a first exemplary embodiment.

FIG. 1 illustrates a heat storage device 12 of a first exemplary embodiment according to technology disclosed herein, together with an automobile engine 14 and the like.

As fuel, the engine 14 of the first exemplary embodiment employs compressed natural gas (CNG) as an example of a gas phase fuel. An example of compressed natural gas is gas in which the main component is methane. A fuel tank 16 that holds the compressed natural gas, and the engine 14, are connected together by a feed pipe 18. The compressed natural gas inside the fuel tank 16 is supplied to the engine 14 through the feed pipe 18.

The heat storage device 12 includes a heat storage vessel 20. The fuel tank 16 and the heat storage vessel 20 are connected together by a first pipe 30. The compressed natural gas inside the fuel tank 16 is fed to the heat storage vessel 20 through the first pipe 30.

A pressure regulation valve 32 and an open/close valve 34 are provided on the first pipe 30. The pressure of compressed natural gas inside the fuel tank 16 is lowered by the pressure regulation valve 32. By opening or closing the first pipe 30, the open/close valve 34 switches between feeding and non-feeding of compressed natural gas from the fuel tank 16 to the heat storage vessel 20.

The engine 14 and the heat storage vessel 20 are connected together by a second pipe 36. An open/close valve 38 is provided on the second pipe 36. In an open state of the open/close valve 38, compressed natural gas desorbed from the heat storage vessel 20, as described below, is fed through the second pipe 36 to the engine 14.

In the example illustrated in FIG. 1, the second pipe 36 merges with the feed pipe 18 partway along, and part of the feed pipe 18 is a structure doubling as the second pipe 36; however, the second pipe 36 may be connected to the engine 14 independently from the feed pipe 18.

A circulation pipe 42 is connected to the engine 14 so as to circulate engine cooling water between the engine 14 and a radiator 40. The circulation pipe 42 is an example of a circulation flow path. The direction of flow of the engine cooling water is illustrated by the arrows F0.

The circulation pipe 42 includes a bypass pipe 44. The bypass pipe 44 is a pipe through which engine cooling water flows so as to bypass the radiator 40. The circulation pipe 42 branches at a branching section 46 into a pipe on the radiator 40 side of the circulation pipe 42, and into the bypass pipe 44, with the bypass pipe 44 bypassing the radiator 40. Namely, the bypass pipe 44 is connected to the branching section 46 and to a portion at the upstream side of the circulation pipe 42 in the flow direction of the engine cooling water, so as to merge the engine cooling water into the circulation pipe 42 at a merging section 48. A switching valve 50 is provided at the branching section 46 to switch the flow direction of the engine cooling water between the portion on the radiator 40 side of the circulation pipe 42 and the bypass pipe 44. Note that the engine cooling water is still circulated between the engine 14 and the heat storage vessel 20 even when flowing in the bypass pipe 44. In such cases a circulation flow path is configured by a portion of the circulation pipe 42 and the bypass pipe 44.

The heat storage vessel 20 is provided on the circulation pipe 42, between the engine 14 and the switching valve 50.

Figure 2:
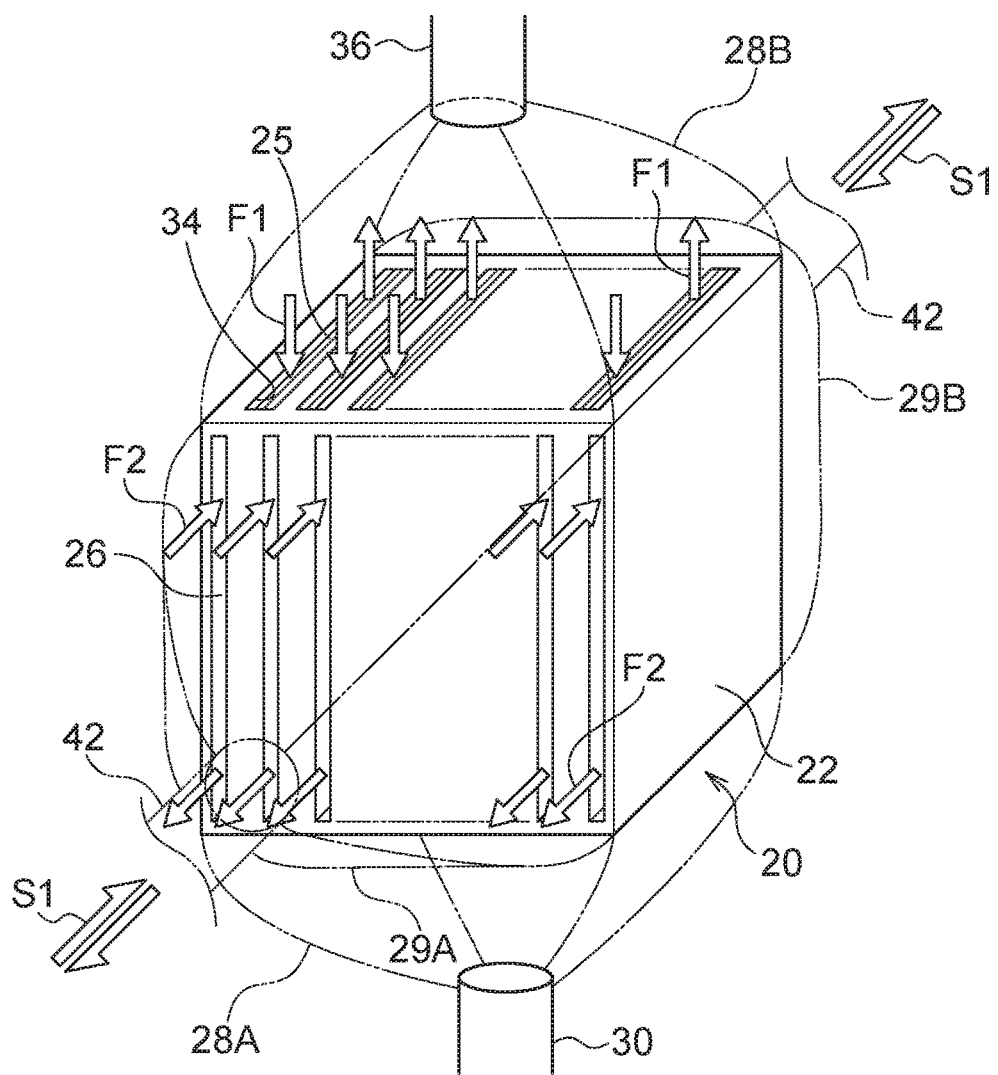
FIG. 2 is a perspective view illustrating a heat storage vessel of a heat storage device of the first exemplary embodiment.
Figure 3:
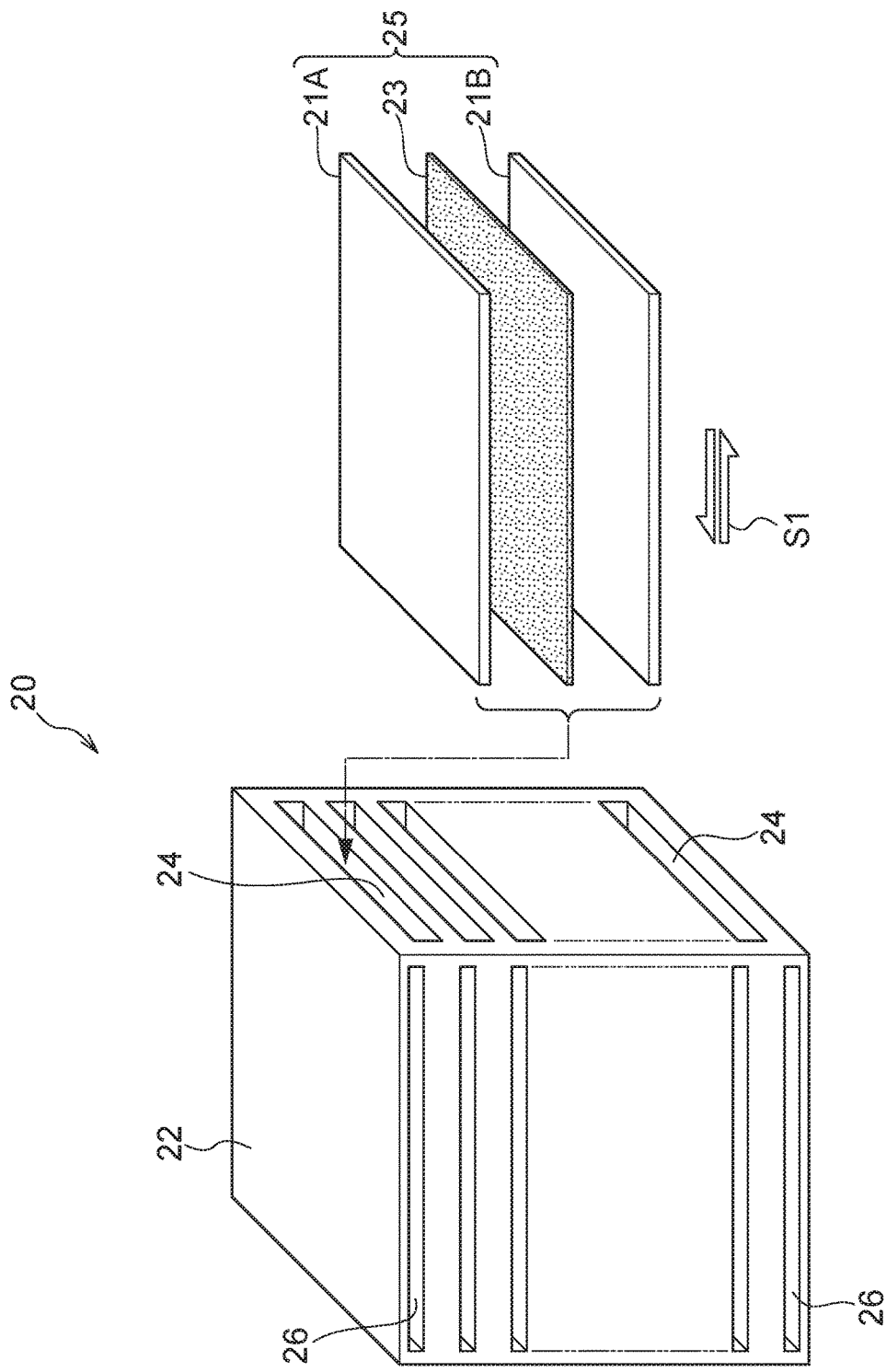
FIG. 3 is an exploded perspective view illustrating a heat storage vessel of a heat storage device of the first exemplary embodiment.

In the first exemplary embodiment, as illustrated in the example of FIG. 2 and FIG. 3, the heat storage vessel 20 includes a casing 22, plural heating medium flow paths 26 provided in the casing 22, plural reaction chambers 24 provided in the casing 22, with a layered body 25 containing adsorbent housed inside each respective reaction chamber 24.

In the casing 22, the reaction chambers 24 and the heating medium flow paths 26 are alternately disposed, and two of the heating medium flow paths 26 are disposed so as to be furthest to the outer sides. The reaction chambers 24 and the heating medium flow paths 26 are separated from each other by partitioning walls. Such a configuration enables heat exchange between externally supplied engine cooling water, and adsorbent molded bodies 21A, 21B (described in detail later) of the layered bodies 25 in the reaction chambers 24.

In the present embodiment, the reaction chambers 24 and the heating medium flow paths 26 are angular, slot-shaped spaces that each have flattened-rectangular open ends. The heat storage vessel 20 is an orthogonal-flow heat exchange reaction vessel, in which the opening direction of the reaction chambers 24 (a flow direction of a fuel gas, the directions of arrows F1) is orthogonal to the opening direction of the heating medium flow paths 26 (a flow direction of the engine cooling water, the directions of arrows F2) in side view.

There are no particular limitations to the number of the reaction chambers 24 and the number of the heating medium flow paths 26 provided in the reaction vessel 20, and the numbers thereof may be suitably set in consideration of the amount of heat to be input to, and output from, the reaction vessel 20, and the surface area of the heat transfer surface of the adsorbent molded bodies 21A, 21B (the contact surface area with the inner walls of the reaction chamber).

However, the heat storage vessel 20 preferably includes two or more reaction chambers stored with adsorbent, in a configuration in which the heating medium flow path 26 is at least disposed between the reaction chambers 24. A configuration having two or more of the reaction chambers 24 and two or more of the heating medium flow paths 26, with the reaction chambers 24 and the heating medium flow paths 26 alternately disposed, is more preferable.

A material having high thermal conductivity and resistance to corrosion by fuel gas, such as a metal (for example stainless steel, aluminum, aluminum alloy, or the like) is suitably applied as the material of the casing 22.

As illustrated in the example in FIG. 3, the layered body 25 is configured including two sheet form layers of the adsorbent molded bodies 21A, 21B, and a support body 23 sandwiched between the adsorbent molded bodies 21A, 21B. The adsorbent molded bodies 21A, 21B store heat when fuel gas is desorbed, and dissipate heat when fuel gas is adsorbed. For visibility purposes the configuration of the layered body 25 is illustrated in FIG. 3 with the adsorbent molded body 21A, the support body 23, and the adsorbent molded body 21B separated out.

However, the configuration of the layered body is not limited thereto, and, for example, another configuration may be adopted in which there are alternately disposed adsorbent molded bodies and support bodies, with adsorbent molded bodies as the outermost layers (for example a five layered configuration such as adsorbent molded body/support body/adsorbent molded body/support body/adsorbent molded body).

The adsorbent molded bodies 21A, 21B each contain an adsorbent that stores heat via an endothermic reaction when fuel gas is desorbed, and that dissipates heat via an exothermic reaction when fuel gas is adsorbed The adsorbent housed in the reaction vessel of technology disclosed herein is not limited to adsorbent molded bodies in sheet form (for example the adsorbent molded bodies 21A, 21B) and a powdered adsorbent may be employed therefor. However, from the perspective of further raising the efficiency of heat exchange in the reaction vessel, the adsorbent housed in the reaction vessel is preferably in sheet form.

The support body 23 is not limited to the flat sheet form as illustrated in the example of FIG. 3, and may, for example, be a corrugated sheet or a multi-pore sheet.

The heat storage material of the heat storage vessel 20 may be a chemical heat storage material that adsorbs fuel gas via a coordination reaction, or may be a physical heat storage material that adsorbs the fuel gas via physical adsorption.

A support body that is capable of allowing fuel gas to flow in a direction along the surface of the support body 23 (for example the directions illustrated by the white arrows S1 in FIG. 3) is preferably employed as the support body 23. This thereby enables a flow path for fuel gas to be secured between two sheets of the adsorbent molded bodies 21A, 21B, enabling the fuel gas supplied from the first pipe 30 to be supplied over a wide area of the adsorbent molded bodies 21A, 21B. Moreover, the fuel gas adsorbed over a wide area of the adsorbent molded bodies 21A, 21B can be released toward the second pipe 36 through the support body 23.

More specifically, a corrugated sheet or a multi-pore sheet may be employed as the support body 23.

Fuel gas can pass through the multi-pore sheet interior in cases in which a multi-pore sheet is employed as the support body 23.

Fuel gas passes thorough gaps occurring in the layered bodies 25 between the corrugated sheet and the adsorbent molded bodies 21A, 21B in cases in which a corrugated sheet is employed as the support body 23.

In the example as illustrated in FIG. 2, the reaction vessel 20 and the first pipe 30 are connected together through a header member 28A (for example a manifold or the like) that communicates the plural reaction chambers 24 inner side the reaction vessel 20 with the first pipe 30 in an airtight state. The heat storage vessel 20 and the second pipe 36 are connected together through a header member 28B (for example a manifold or the like) that communicates the plural reaction chambers 24 inner side the reaction vessel 20 with the second pipe 36 in an airtight state. The header member 28A and the header member 28B are positioned on the opposite sides of the casing 22 to each other, such that fuel gas is fed from the first pipe 30 to the plural reaction chambers 24 in an airtight state, and fuel gas is fed from the plural reaction chambers 24 to the second pipe 36 in an airtight state.

The heat storage vessel 20 is connected to the circulation pipe 42 through the header member 29A (for example a manifold or the like) and is connected to the circulation pipe 42 through the header member 29B (for example a manifold or the like). The plural heating medium flow paths 26 inside the heat storage vessel 20 are in communication in an airtight state with the circulation pipe 42 through the header member 29A, and are in communication in an airtight state with the circulation pipe 42 through the header member 29B. A configuration is thereby adopted in which the engine cooling water is able to flow through the circulation pipe 42 between the heating medium flow paths 26 inside the heat storage vessel 20 and the engine 14.

In FIG. 2, in order to make the configuration of the heat storage vessel 20 more visible, the header members 28A, 28B, 29A, 29B are illustrated with double-dotted dashed lines.

As illustrated in the example of FIG. 1, the open/close valves 34, 38 and the switching valve 50 are controlled by a controller 52.

Next, explanation follows regarding operation of the present exemplary embodiment.

Figure 4:
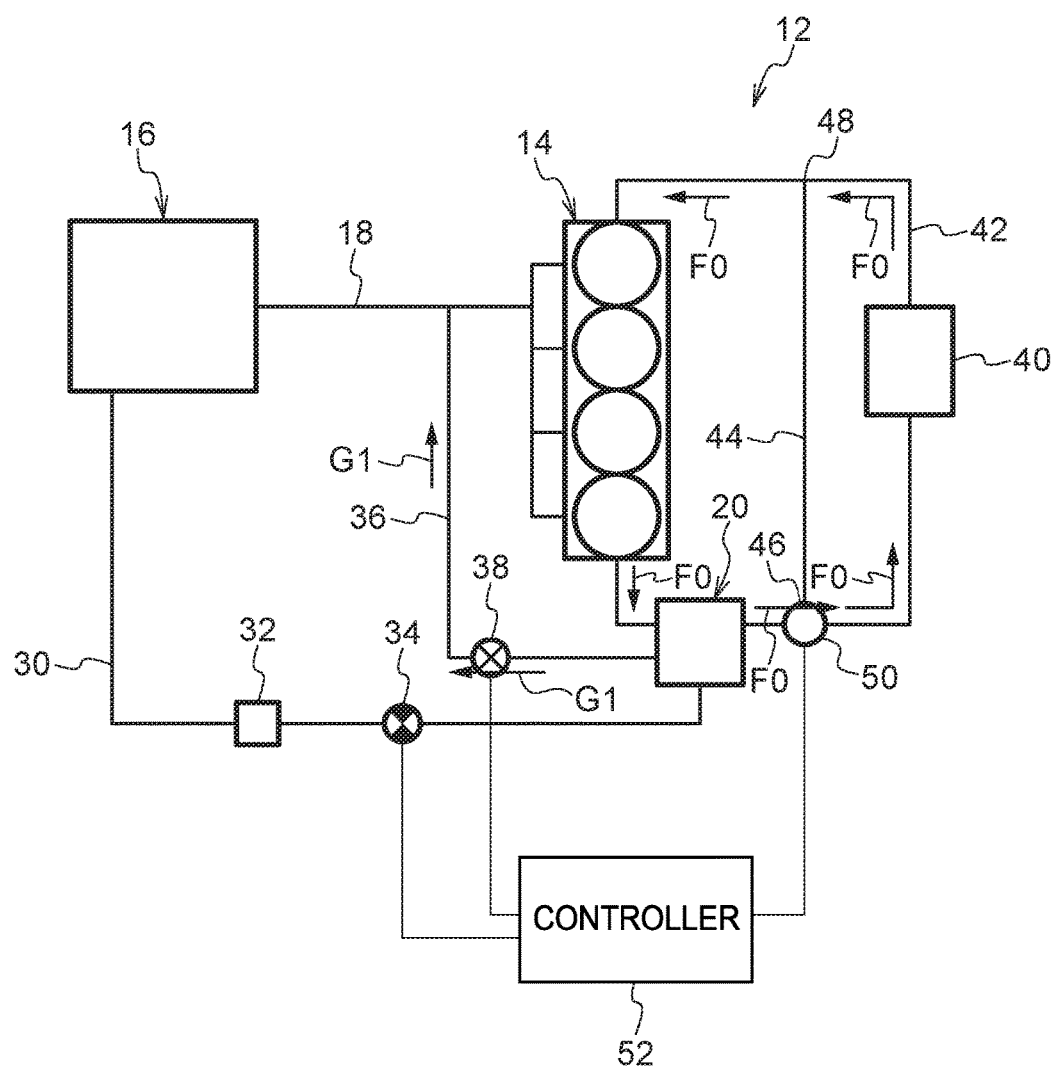
FIG. 4 is a schematic diagram illustrating a heat storage device of the first exemplary embodiment in a heat storage mode state.
Figure 5:
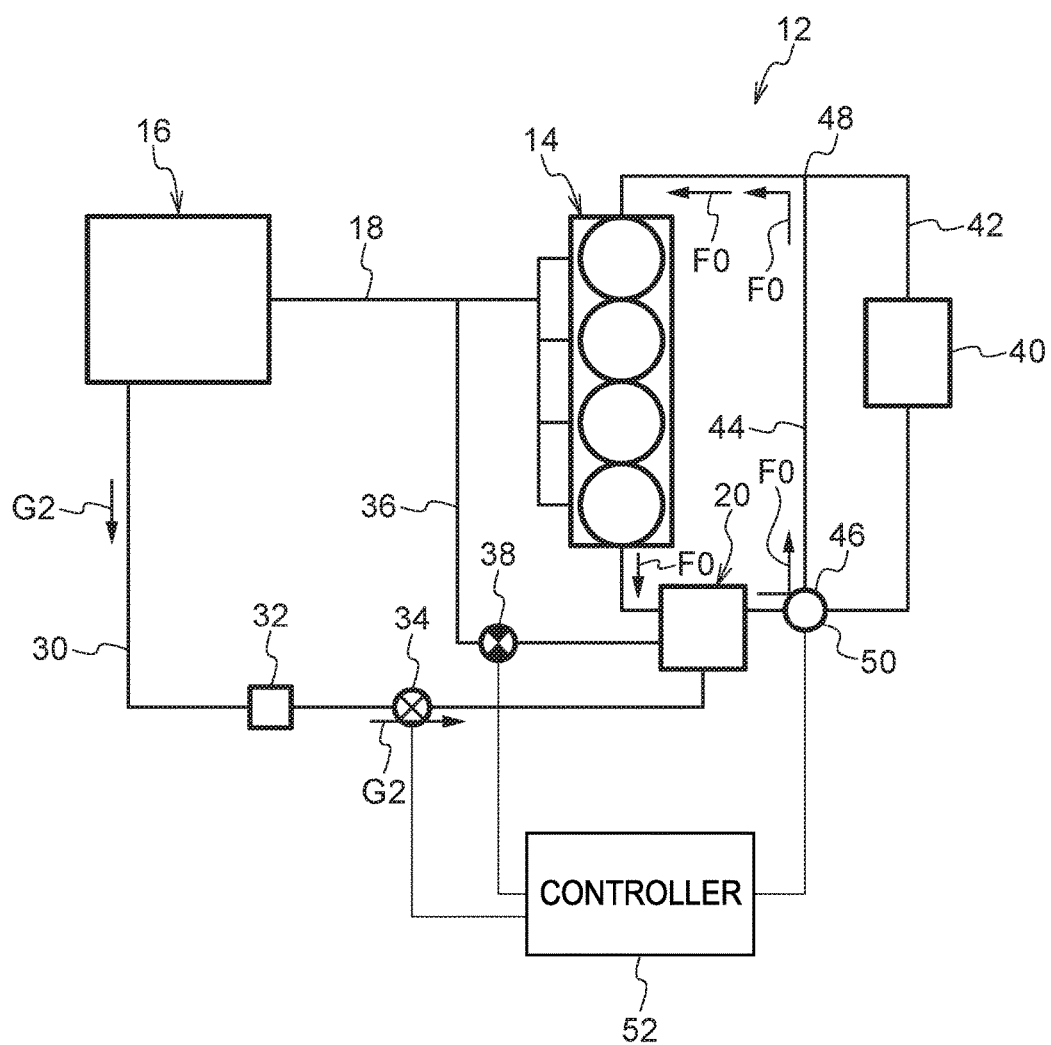
FIG. 5 is a schematic diagram illustrating a heat storage device of the first exemplary embodiment in a heat dissipation mode state.

In the present exemplary embodiment, the heat storage vessel 20 is able to adopt two operation modes: a heat storage mode and a heat dissipation mode. The heat storage mode indicates an operation mode in which heat is stored, as illustrated in the example of FIG. 4, and the heat dissipation mode indicates an operation mode in which heat is dissipated, as illustrated in the example of FIG. 5.

In the heat storage mode, the fuel gas is initially in an adsorbed state in the heat storage material of the heat storage vessel 20. During running of a vehicle, as illustrated in the example of FIG. 4, the controller 52 switches the switching valve 50 to the radiator 40 side. The engine cooling water that has been employed for cooling the engine and raised in temperature (to, for example, approximately 90° C.) thereby flows to the radiator 40 without passing through the bypass pipe 44, as illustrated by the arrows F0, and circulates in the circulation pipe 42.

In the heat storage mode, the controller 52 closes the open/close valve 34 and opens the open/close valve 38. Closing the open/close valve 34 realizes a state in which the fuel gas of the fuel tank 16 is not fed to the heat storage vessel 20.

Then, in the heat storage vessel 20, heat is received from the engine cooling water, and heat is stored accompanying the desorption of fuel gas. Moreover, due to the open/close valve 38 being open, the desorbed fuel gas flows through the second pipe 36 to the engine 14 as illustrated by the arrows G1, and is combusted in the engine 14.

When the vehicle (the engine 14) is stopped, a state is thus maintained in which the heat of the engine 14 is stored in the heat storage vessel 20.

When the engine 14 is started up, the heat dissipation mode illustrated in FIG. 5 is adopted. In the heat dissipation mode, the controller 52 switches the switching valve 50 to the bypass pipe 44 side. The engine cooling water is circulated so as to bypass the radiator 40, as illustrated by arrows F0.

Moreover, in the heat dissipation mode, the controller 52 opens the open/close valve 34 and closes the open/close valve 38. The open/close valve 34 is open, and so, as illustrated by arrows G2, the fuel gas of the fuel tank 16 is fed to the heat storage vessel 20. When this occurs, the fuel gas is decompressed (pressure-regulated) to a specific pressure by the pressure regulation valve 32, thereby enabling the fuel gas to be efficiently adsorbed in the heat storage vessel 20.

In the heat storage vessel 20, the fuel gas is adsorbed, and heat is generated (dissipated). This heat can be employed as an engine heater, as a heater inside the vehicle, or the like.

The open/close valve 38 is closed, and so fuel gas does not flow from the heat storage vessel 20 to the engine 14 through the second pipe 36.

In the heat storage device 12 of the first exemplary embodiment, as is apparent from the above explanation, the fuel (fuel gas) held in the fuel tank 16 is employed as a medium (reaction medium) adsorbed and desorbed in the heat storage vessel 20, and there is no need for a member (tank or the like) for holding a reaction medium, nor for a condenser, adsorption vessel, or the like for the reaction medium. The present exemplary embodiment is accordingly able to achieve both a more compact and simpler structure than a heat storage device including such members.

Next, explanation follows regarding a second exemplary embodiment. In the second exemplary embodiment, the same reference numerals are appended to similar elements, members, and the like to those of the first exemplary embodiment, and detailed explanation thereof is omitted.

Figure 6:
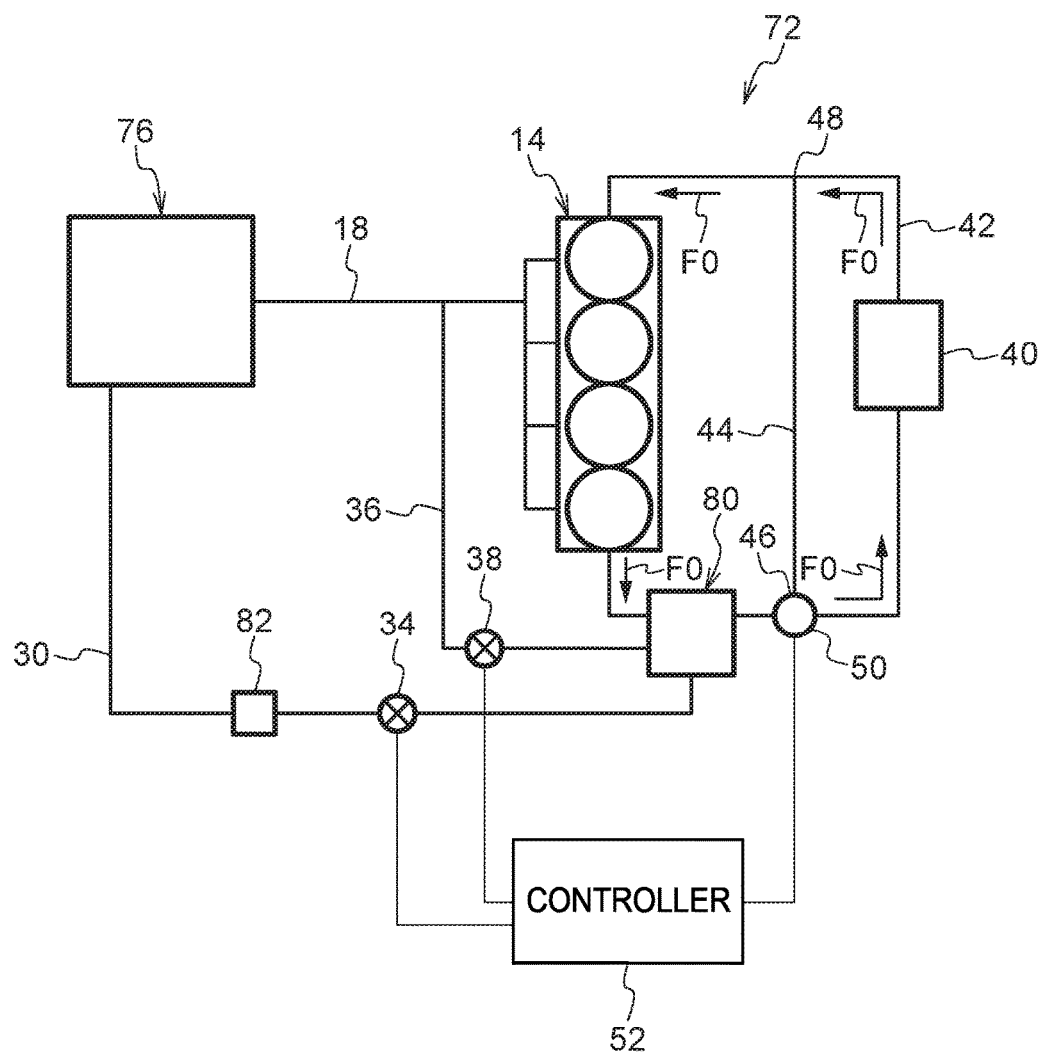
FIG. 6 is a schematic diagram illustrating a configuration of a heat storage device of a second exemplary embodiment.

As illustrated in FIG. 6, a heat storage device 72 of the second exemplary embodiment includes, as a fuel tank, a fuel tank 76 holding a liquid phase fuel (a liquid fuel, for example gasoline).

In the second exemplary embodiment, a vaporizer 82 is provided to a first pipe 30, in place of the pressure regulation valve 32 of the first exemplary embodiment (see FIG. 1). The vaporizer 82 vaporizes liquid fuel using external energy. Namely, the fuel (liquid fuel) in the fuel tank 76 is fed to a heat storage vessel 80 in a state vaporized by the vaporizer 82.

In the second exemplary embodiment, the liquid fuel held in the fuel tank 76 is, for example, gasoline. The vaporizer 82 of the second exemplary embodiment houses an adsorbent suitable for adsorbing and desorbing vaporized gasoline.

Note that, in the second exemplary embodiment, a similar structure to that of the heat storage vessel 20 of the first exemplary embodiment (see FIG. 2 and FIG. 3) is employed for the structure of the heat storage vessel 80. However, as the heat storage material, a heat storage material is employed that is suitable for adsorbing and desorbing fuel gas in a state in which the liquid fuel in the fuel tank 76 has been vaporized.

Figure 7:
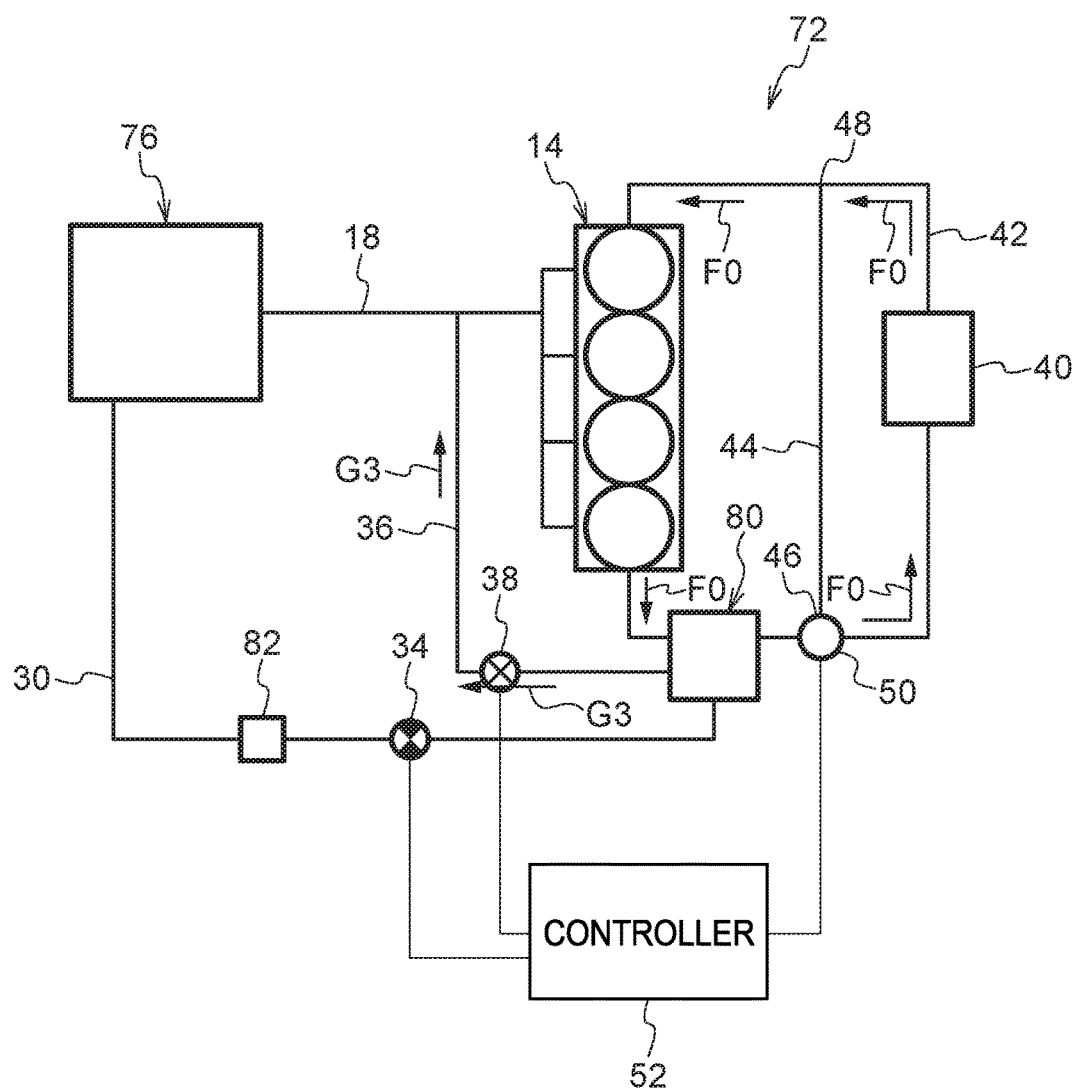
FIG. 7 is a schematic diagram illustrating a heat storage device of the second exemplary embodiment in a heat storage mode state.
Figure 8:
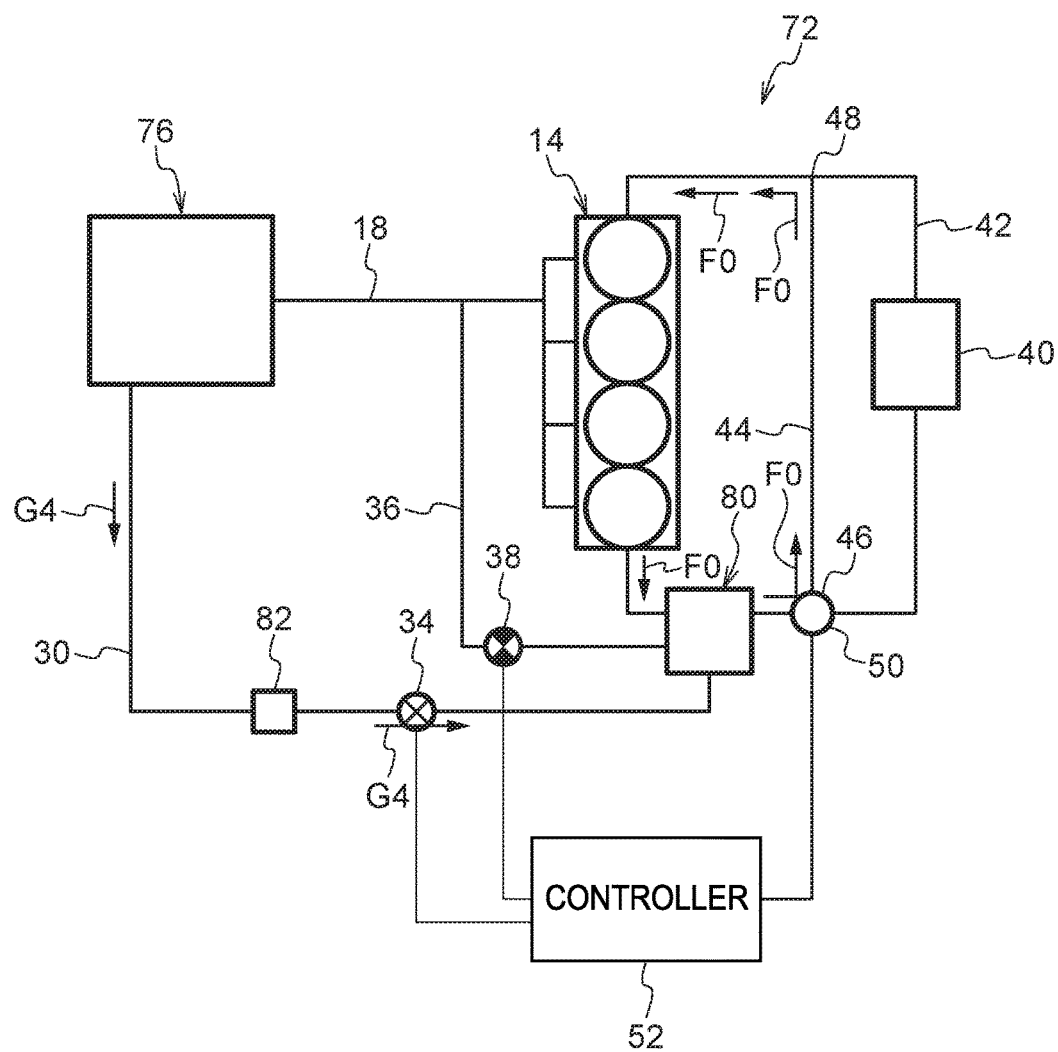
FIG. 8 is a schematic diagram illustrating a heat storage device of the second exemplary embodiment in a heat dissipation mode state.

The heat storage device 72 of the second exemplary embodiment also adopts a heat storage mode, as illustrated in FIG. 7, and a heat dissipation mode, as illustrated in FIG. 8.

In the heat storage mode, the controller 52 closes the open/close valve 34 and opens the open/close valve 38. The fuel gas vaporized by the vaporizer 82 is not fed to the heat storage vessel 80 due to the open/close valve 34 being closed. In the heat storage vessel 80, heat is received from the engine cooling water, and heat is stored as the fuel gas is desorbed. Due to the open/close valve 38 being open, the desorbed fuel gas flows through the second pipe 36 to the engine 14, as illustrated by the arrows G3, and is combusted in the engine 14.

When the vehicle (the engine 14) is stopped, a state is thus maintained in which the heat of the engine 14 is stored in the heat storage vessel 80.

When the engine 14 is started up, in the heat dissipation mode, the controller 52 switches the switching valve 50 to the bypass pipe 44 side. The engine cooling water is circulated so as to bypass the radiator 40. In the heat dissipation mode, the controller 52 opens the open/close valve 34 and closes the open/close valve 38. The open/close valve 34 is open, and so, as illustrated by arrows G4, the fuel (liquid fuel) of the fuel tank 76 is vaporized by the vaporizer 82 and fed to the heat storage vessel 80.

The fuel gas is adsorbed in the heat storage vessel 80, and heat is generated (heat is dissipated). This heat can be employed as a heater for the engine 14, as a heater inside the vehicle, or the like. The open/close valve 38 is closed, and so fuel gas does not flow from the heat storage vessel 80 to the engine 14 through the second pipe 36.

In the second exemplary embodiment too, the fuel (liquid fuel) held in the fuel tank 76 is employed as a medium (reaction medium) adsorbed and desorbed in the heat storage vessel 80, and there is no need for a tank for holding a reaction medium, nor for a condenser, adsorption vessel, or the like for the reaction medium. The second exemplary embodiment is accordingly also able to achieve both a more compact and simpler structure than a heat storage device including such members.

The heat storage device 72 of the second exemplary embodiment includes the vaporizer 82, and so even though the fuel held in the fuel tank 76 is liquid fuel, the liquid fuel can be vaporized and adsorbed in the heat storage vessel 80. Since the fuel tank 76 does not hold compressed gas, there is no need for high pressure withstanding ability or durability therein.

In contrast thereto, a configuration in which, as in the first exemplary embodiment, gas phase fuel (fuel gas) is held in the fuel tank 16, has no need to vaporize the fuel when feeding the fuel to the heat storage vessel 20, and no vaporizer is required. The fuel gas can be efficiently fed as fuel gas to the heat storage vessel 20 by employing pressure (tank internal pressure) of the fuel gas in the fuel tank 16.

Note that another fuel, such as liquefied natural gas (LNG), liquefied petroleum gas (LPG), or diesel oil, may also be employed as the fuel held in the fuel tank (the fuel combusted by the engine 14). In a configuration employing gas phase fuel having a sufficiently high pressure in a discharged state from the fuel tank to the first pipe 30, a configuration, such as in the first exemplary embodiment, including a pressure regulation valve 32 to perform pressure regulation (pressure reduction) may be employed. In contrast thereto, in a configuration employing a fuel that is in the liquid phase in the discharged state from the fuel tank to the first pipe 30, a configuration, such as in the second exemplary embodiment, including the vaporizer 82 to feed the fuel to the heat storage vessel 80 when the fuel is in a vaporized state may be employed.

In each of the exemplary embodiments, the fuel desorbed from the heat storage vessel 20, 80 is fuel that was held in the fuel tank 16, 76, namely is fuel to be combusted in the engine 14. The fuel desorbed from the heat storage vessel 20, 80 can be utilized by the engine 14 as fuel, and a member, for example an adsorption vessel, is not needed for re-storing this fuel.

However, in a configuration provided with an additional adsorption vessel, heat exchange is also performed during adsorption and desorption of a reaction medium in the adsorption vessel. A heat source is also needed to maintain the temperature during adsorption and desorption within a specific range, with concerns regarding this leading to a more bulky and complicated heat storage device. However, in each of the above exemplary embodiments, not only is there no need for an additional adsorption vessel, but a heat source is also not required, thereby enabling a simpler and more compact structure to be achieved for the heat storage device.

In each of the above exemplary embodiments, the heat storage material employed in the heat storage vessel 20, 80 may be determined according to the type of fuel. For example, an adsorbent that adsorbs and desorbs fuel gas may be employed as the heat storage material. Employing such an adsorbent enables the fuel gas to be adsorbed by the adsorbent, and efficient heat dissipation to be achieved.

Fuel gas (CNG and LNG) can be adsorbed and desorbed if a porous adsorbent having a pore size of 10 nm or smaller is employed as the adsorbent, and a large functional surface area can be obtained for adsorbing the fuel gas, enabling highly efficient adsorption and desorption.

Specific examples of porous adsorbents include carbon adsorbents containing carbon (such as activated carbon or carbon black), zeolites, and metal organic frameworks (MOF). Carbon adsorbents are readily available, have pore sizes spread over a wide range of sizes so as to enable various fuels to be adsorbed and desorbed, and are able to accommodate variation in the particle size of the fuel gas.

In contrast thereto, adsorbents have a small variation in pore size are obtained from zeolites and MOF due to being formed with fine pores of a specific pore size. Excellent adsorption and desorption characteristics can be exhibited thereby for a fuel gas that is known in advance to have a particle size within a specific range.

A chemical heat storage material that dissipates heat due to chemical reaction with (fixing) the fuel gas may be employed as the heat storage material, depending on the type of fuel. An example of a heat storage material for cases in which the fuel is ammonia ($NH_3$) is a metal chloride-based chemical heat storage material. For example, a metal halide chemical heat storage material may be employed that includes at least one metal halide selected from the group consisting of a chloride, bromide, or iodide of an alkali metal, a chloride, bromide, or iodide of an alkali earth metal, and a chloride, bromide, or iodide of a transition metal.

What is claimed is:

1. A heat storage device comprising:
   a fuel tank that is configured to hold a fuel to be combusted in an engine;
   a heat storage vessel including a heat storage material that is configured to dissipate heat by adsorbing or chemically reacting with a fuel gas, and that is configured to store heat while desorbing the fuel gas;
   a first flow path that is configured to feed the fuel from the fuel tank to the heat storage vessel;
   a second flow path that is configured to feed the fuel gas from the heat storage vessel to the engine; and
   a third flow path that connects the fuel tank with the engine directly, and that is configured to feed the fuel from the fuel tank to the engine directly,
   wherein the heat storage vessel and the fuel tank are disposed separately from each other and are connected via the first flow path such that a heat generating value of the heat storage vessel is changeable depending on whether the fuel is supplied to the heat storage vessel from the fuel tank.

2. The heat storage device of claim 1, further comprising a circulation flow path that is configured to circulate engine cooling water between the heat storage vessel and the engine.

3. The heat storage device of claim 2, wherein the heat storage vessel is configured to desorb the fuel gas using heat from the engine cooling water.

4. The heat storage device of claim 1, wherein the heat storage material is an adsorbent that adsorbs the fuel gas.

5. The heat storage device of claim 1, wherein the fuel is a gaseous fuel that is in a gaseous phase in a state of being held in the fuel tank.

6. The heat storage device of claim 5, wherein a pressure regulation valve is provided on the first flow path to regulate a pressure of the gaseous fuel.

7. The heat storage device of claim 1, wherein:
   the fuel is a liquid fuel that is in a liquid phase in a state of being held in the fuel tank; and
   a vaporizer is provided on the first flow path, the vaporizer being configured to vaporize the liquid fuel.

8. The heat storage device of claim 1, further comprising:
   an open/close valve that is provided on the first flow path and that is configured to switch between (i) an open position in which the fuel is fed from the fuel tank to the heat storage vessel and (ii) a closed position in which the fuel is not fed from the fuel tank to the heat storage vessel, while the fuel is directly fed from the fuel tank to the engine via the third flow path.

* * * * *